3,729,530
THERMOPLASTIC COMPOSITIONS COMPRISING POLY-1-OLEFIN AND A POLYMER OF CHLORINATED OXETANE
Leonard L. Curry, San Rafael, Calif., assignor to Chevron Research Company, San Francisco, Calif.
No Drawing. Original application June 1, 1970, Ser. No. 42,507. Divided and this application Nov. 24, 1971, Ser. No. 201,961
Int. Cl. C08f 29/12
U.S. Cl. 260—897 C            3 Claims

ABSTRACT OF THE DISCLOSURE

Compositions of normally solid poly-1-alkene such as polypropylene and from about 1 to about 20 percent by weight based on the total composition of crystalline chlorinated linear polypentyl ether are embossable to provide thermoplastic articles characterized by raised portions having contrasting color.

---

This is a division, of application Ser. No. 42,507, filed June 1, 1970.

BACKGROUND OF THE INVENTION

This invention is directed to novel contrast color embossable thermoplastic compositions. More particularly, it concerns compositions of normally solid poly-1-alkenes and crystalline chlorinated linear polypentyl ether as well as the production of contrast color embossable thermoplastic articles therefrom.

Articles of thermoplastic polymers of vinyl chloride in the form of sheets or tapes can be mechanically embossed to provide raised portions such as figures, numbers, or letters of contrasting color. These embossed thermoplastic sheets or tapes are widely used as labels or signs. They are readily produced in portable hand-operated embossing machines. Such labels and signs are quite discernible because the thermoplastic polymer turns white and gives a contrasting color where embossed due to the cold flow deformation which alters the internal structure.

Thermoplastic articles of normally solid 1-alkenes have some physical advantages over polymers of vinyl chloride. For example, the poly-1-alkenes such as stereoregular polypropylene are able to withstand considerably higher temperatures without softening. Furthermore, the lower modulus of the normally solid poly-1-alkenes allows them to conform better to whatever shape or object they are fastened to. However, such poly-1-alkenes, as exemplified by polypropylene, do not give a contrast color when embossed and, therefore, have not been suitable for the production of labels and signs.

SUMMARY OF THE INVENTION

Solid thermoplastic compositions suitable for contrast color embossing have now been found consisting essentially of stereoregular polypropylene insoluble in boiling heptane and from about 1 to about 20 percent by weight based on the total composition of crystalline chlorinated linear polyneopentyl ether having a molecular weight in the range of from about 50,000 to about 500,000.

There has also been found, in accordance with this invention, that improvement in the method of producing contrast color embossed plastic articles which comprises applying force to a normally solid poly-1-alkene composition as described above to cause permanent cold flow deformation of said normally solid poly-1-alkene composition to give a shape structure having an original uniform background color, said shaped structure being disturbed by said deformation to produce embossment having a contrasting color.

The method of this invention referred to above results in new and useful shaped articles such as sheets or tapes suitable for mechanical embossing in the preparation of labels and signs.

The normally solid poly-1-alkenes of the compositions of this invention are extrudable or moldable. They are substantially crystalline and have molecular weights of at least about 20,000. For present purposes the preferred polyalkene is substantially stereoregular polypropylene which is generally characterized as being insoluble in boiling heptanes. The normally solid commercial polypropylenes, which may be used, are at least about 85% by weight heptane insoluble. Examples of other poly-1-alkenes include polyethylene, poly-1-butene and poly-4-methyl-1-pentene.

The stereoregular poly-1-alkenes are prepared by known methods using Ziegler-type catalysts also known as coordination catalysts, which usually consist of an organoaluminum compound and a transition metal halide. The organoaluminum compounds are exemplified by alkyl aluminums and alkyl aluminum halides in which the alkyl groups contain 1 to 6 carbon atoms, and the halogen is chlorine or bromine. Compounds such as trimethyl aluminum, triethyl aluminum, tributyl aluminum, trihexyl aluminum, and dimethyl aluminum chloride are illustrative. The transition metal halide is usually a chloride or bromide of titanium. In the production of stereoregular polypropylene the catalyst combination of diethyl aluminum chloride with activated violet titanium trichloride is quite effective.

The crystalline chlorinated linear polyneopentyl ether of the compositions previously mentioned, as already mentioned, has a molecular weight in the range of from about 50,000 to about 500,000. The monomer, a chlorinated oxetane, is synthesized from pentaerythritol. The polymer results from the following reaction scheme:

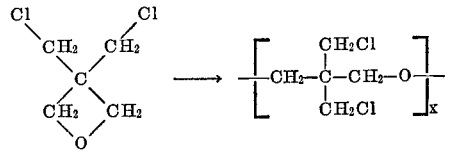

The polymer contains approximately 45% by weight chlorine in the form of a chlormethyl group attached to a central carbon atom. It is linear in nature and crystalline.

The normally solid poly-1-alkene such as the stereoregular polypropylene, as already noted above, does not give contrast color or "stress whitening" when subjected to the stress of mechanical embossing. The proportions of chlorinated polyether in the compositions of the invention are critical. Less than 1% by weight in polypropylene gives little or no color contrast upon embossment. At about 1% by weight adequate contrast compared to the normal background color is obtained. When concentrations of over 20% by weight of crystalline chlorinated linear polyether are used, the excess additive results in overwhitening of the polypropylene material and also changes the physical properties of the polypropylene structure itself. Accordingly, the preferred concentration of chlorinated polyether in polypropylene for clear materials is in the range of from about 3 to about 5% by weight of the total composition.

The compositions of the invention are readily prepared by mixing the normally solid poly-1-alkene and the crystalline chlorinated linear polyether normally in powder or granulated form. The materials are intimately mixed as by a Brabender mixer and preferably at an elevated temperature—for example, at about 200° C. The temperature is maintained by an oil bath. The mixed materials are usually cooled to a solid state and converted to granule form or other shape by known methods, thereby providing a product suitable for molding or extrusion in conventional equipment in the form of sheets or tapes.

The compositions, their method of utilization in the production of contrast color embossed articles, and the embossed articles in accordance with the present invention are further illustrated by the following examples. Unless otherwise specified, the proportions in the compositions are on a weight basis.

EXAMPLES

Several mixtures of stereoregular Ziegler-type polypropylene and crystalline chlorinated polyneopentyl ether were prepared. The polyether had an average molecular weight in the range from about 250,000 to 350,000 and contained approximately 46% by weight chlorine. It is sold under the trademark "Penton" of Hercules, Inc., Wilmington, Del. The polypropylene and chlorinated linear polyneopentyl ether were mixed in proportions of 1%, 2%, 5% and 10% in a Brabender mixer heated at 200° C. by an oil bath. On cooling, the solid mixture was granulated in a Wiley mill and then molded into sheets by pressing between metal platens at a temperature of about 450° F. for two minutes to a thickness of 10 to 15 mils. One-half inch wide strips were cut from the molded sheets. These strips were run through a Dymo tapewriter for a visual evaluation of stress whitening properties.

In the mechanical embossment evaluation as outlined above it was found that on a clear film the best whitening properties occurred at proportions of from about 5 to 10% by weight chlorinated polypentyl ether. Red color films were also prepared, and it was found that proportions of chlorinated polypentyl ether should be higher, in general, up to 20%, to provide suitable contrast. It was also determined that concentrations above 20% by weight chlorinated polypentyl ether tend to give too much stress whitening for desired legibility.

For the purposes of comparison, other combinations with polypropylene were evaluated. For example, polyvinyl chloride (Geon 101) was blended in amounts of 1%, 5% and 10% by weight with polypropylene. These blends were found to result in embossed articles which had nonuniform stress whitened figures. Also combinations with ethylene-propylene rubber, ethylene-vinyl acetate copolymer, and acrylonitrile-butadiene rubber did not give stress whitening although there was some apparent flexural whitening.

Although the stereoregular polypropylene and chlorinated linear polyether compositions in accordance with the present invention may be used as such, there are a number of materials which may be also included to provide suitable products for the production of certain types of labels and signs. For example, stabilizers, commonly used in solid thermoplastic compositions to prevent oxidative or ultraviolet degradation or the like, are generally employed. Similarly, plasticizers and color agents to improve the molding and embossing operations as well as provide desired color contrast may be added to the compositions as required. Lubricants or plasticizers of the ester types such as dioctylphthalate are likewise useful.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

I claim:

1. A solid thermoplastic composition suitable for contrast color embossing consisting essentially of stereoregular polypropylene insoluble in boiling heptane and from about 1 to about 20% by weight based on the total composition of crystalline chlorinated linear polyneopentyl ether having a molecular weight in the range of from about 100,000 to about 500,000 and consisting of reccuring units of the formula

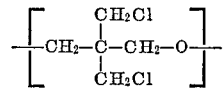

2. A solid thermoplastic composition in accordance with claim 1 containing a color agent in amount sufficient to provide desired background color and the crystalline chlorinated polyneopentyl ether in amounts of from about 10 to about 20% by weight.

3. A shaped article of the solid thermoplastic composition of claim 1.

References Cited

UNITED STATES PATENTS 3,303,148   2/1967   Joyner et al. _____ 260—17
2,947,722   8/1960   Boardman _____ 260—45.8 S SAMUEL H. BLECH, Primary Examiner C. J. SECCURO, Assistant Examiner U.S. Cl. X.R.

260—41 R, 2 XA, 896, 897 R; 264—293, 320